United States Patent [19]

D'Avello et al.

[11] E Patent Number: Re. 32,768

[45] Reissued Date of Patent: Oct. 18, 1988

[54] CERAMIC BANDSTOP FILTER

[75] Inventors: Robert F. D'Avello, Hoffman Estates; Raymond L. Sokola, Lake Zurich, both of Ill.

[73] Assignee: Motorola, Inc., Schaumburg, Ill.

[21] Appl. No.: 793,059

[22] Filed: Oct. 30, 1985

Related U.S. Patent Documents

Reissue of:

[64] Patent No.: 4,426,631
Issued: Jan. 17, 1984
Appl. No.: 349,347
Filed: Feb. 16, 1982

[51] Int. Cl.[4] ..... H01P 1/202; H01P 7/04

[52] U.S. Cl. ..... 333/202; 333/206; 333/207; 333/222; 333/245

[58] Field of Search ..... 333/202, 204, 205, 206, 333/207, 219, 222, 230, 245, 246, 235, 208–212

[56] References Cited

U.S. PATENT DOCUMENTS

| | | | |
|---|---|---|---|
| 2,623,946 | 12/1952 | Cornes | 333/206 |
| 3,413,577 | 11/1968 | Massano . | |
| 3,505,618 | 4/1970 | McKee | 333/203 |
| 3,691,487 | 9/1972 | Yoshimoto | 333/202 |
| 3,713,051 | 1/1973 | Kell | 333/202 X |
| 3,728,731 | 4/1973 | Choi et al. . | |
| 3,798,578 | 3/1974 | Konishi et al. | 333/229 |
| 3,811,101 | 5/1974 | Karp | 334/42 |
| 3,938,064 | 2/1976 | O'Bryan, Jr. et al. | 333/204 |
| 3,973,226 | 8/1976 | Affolter et al. | 333/202 |
| 4,101,854 | 7/1978 | Gikow et al. | 333/224 |
| 4,136,320 | 1/1979 | Nishikawa et al. . | |
| 4,179,673 | 12/1979 | Nishikawa et al. | 333/204 |
| 4,211,987 | 7/1980 | Pan | 333/230 |
| 4,223,287 | 9/1980 | Nishikawa et al. | 333/206 |
| 4,228,539 | 10/1980 | Hämäläinen | 333/224 X |
| 4,255,729 | 3/1981 | Fukasawa et al. | 333/202 |
| 4,264,881 | 4/1981 | DeRonde | 333/204 X |
| 4,268,809 | 5/1981 | Makimoto et al. | 333/202 |
| 4,276,525 | 6/1981 | Nishikawa et al. | 333/206 |
| 4,283,697 | 8/1981 | Masuda et al. | 333/202 |
| 4,287,494 | 9/1981 | Hashimoto et al. | 333/202 |
| 4,292,610 | 9/1981 | Makimoto et al. | 333/222 |
| 4,342,972 | 8/1982 | Nishikawa et al. | 333/206 |
| 4,361,820 | 11/1982 | Sagawa et al. | 333/206 |
| 4,386,328 | 5/1983 | Masuda et al. | 333/202 |
| 4,410,868 | 10/1983 | Meguro et al. | 333/202 |
| 4,425,555 | 1/1984 | Meguro et al. | 333/202 |
| 4,434,410 | 2/1984 | Miyake et al. | 333/224 |
| 4,450,421 | 5/1984 | Meguro et al. | 333/202 |

OTHER PUBLICATIONS

"Microwave Dielectric Resonator Filters Utilizing $Ba_2Ti_9O_{20}$Ceramics by J. K. Plourde and D. F. Linn-1977. IEEE MTT-S International Microwave Symposium Digest, pp. 1–4.

(List continued on next page.)

*Primary Examiner*—Marvin L. Nussbaum
*Attorney, Agent, or Firm*—Rolland R. Hackbart

[57] ABSTRACT

An embodiment of a unique ceramic bandstop filter is comprised of a dielectric plate having an input electrode disposed centrally on the top surface thereof and a dielectric block fixedly attached to the bottom surface of the plate and having a hole opposite the input electrode. The dielectric material is preferably a ceramic comprised of BaO, $TiO_2$ and $ZrO_2$: The dielectric block is entirely plated with copper or silver except for a portion of the top surface surrounding the hole and is essentially a short-circuited coaxial transmission line. In another embodiment of the unique ceramic bandstop filter, a dielectric block has a hole extending between top and bottom surfaces thereof and an input electrode plated on the top surface near the hole. The dielectric block is entirely plated with copper or silver except for a portion of the top surface surrounding the input electrode and hole. Shunt capacitors or inductors can be plated on the top surface of both embodiments of the unique ceramic bandstop filter fr providing a bandstop/bandpass response characteristic.

74 Claims, 2 Drawing Sheets

OTHER PUBLICATIONS

"The Ternary Systems BaO-TiO2-SnO2 and BaO-TiO2-Zro2" by G. H. Jonker and W. Kwestroo-Journal of American Ceramic Society, vol. 41/10, pp. 390 through 394.

"Coaxial Filters-A Practical Design Technique" by J. F. Lally and R. R. Ciehoski-Electronics-Aug. 30, 1963, pp. 35 and 36.

"A New $BaO-TiO_2$ Compound with Temperature-Stable High Permitivity and Low Microwave Loss" by H. M. O'Bryan, Jr., and J. Thomson, Jr. Journal of the American Ceramic Society-O'Bryan et al.-vol. 57, No. 10, Oct., 1974.

"$Ba_2Ti_9O_{20}$ as a Microwave Dielectric Resonator" by J. K. Plourde and D. F. Linn et al.-Journal of the American Ceramic Society, vol. 57, No. 10, Oct., 1974.

"Ceramic-Filled Resonator Cuts Costs of Radio-Telephone Filters," *Electronics*, Jul. 14, 1983, by Tomoki Uwano.

CERAMIC BANDSTOP FILTER

Matter enclosed in heavy brackets [ ] appears in the original patent but forms no part of this reissue specification; matter printed in italics indicates the additions made by reissue.

BACKGROUND OF THE INVENTION

The present invention is related generally to radio frequency (RF) signal filters, and more particularly to improved ceramic bandstop filters that are particularly well adapted for use in radio transmitting and receiving circuitry.

Conventional multi-resonator coaxial filters include a plurality of resonators that are typically foreshortened short-circuited quarter-wavelength coaxial transmission lines. The coaxial resonators may be inductively coupled one to another by apertures in their common walls. Each resonator can be tuned by means of a tuning screw which inserts into a hole extending through the middle of the resonator. Once tuned, the overall response of coaxial filters is determined by the size of the interstage coupling apertures. Since the tuning of coaxial filters can be disturbed by a slight adjustment of the tuning screw, a lock nut is required to keep the tuning screw properly positioned at all times. The use of tuning screws not only renders coaxial filters susceptible to becoming de-tuned, but also creates additional problems including mechanical locking of the tuning screw and arcing between the tuning screw and the resonator structure. Furthermore, coaxial filters tend to be rather bulky, and therefore are relatively unattractive for applications where size is an important factor.

SUMMARY OF THE INVENTION

Accordingly, it is an object of the present invention to provide an improved ceramic bandstop filter that is smaller than prior art filters.

It is another object of the present invention to provide an improved low-loss ceramic bandstop filter that exhibits superior temperature stability.

It is yet another object of the present invention to provide an improved ceramic bandstop filter that can be automatically tuned.

It is a further object of the present invention to provide an improved ceramic bandstop filter that is comprised of a single piece of selectively plated dielectric material.

According to an embodiment of the present invention, a bandstop filter is comprised of a dielectric plate having an input electrode disposed centrally on a first of two flat surfaces thereof and a dielectric block fixedly attached to the second surface of the plate and having a hole opposite the input electrode. The dielectric material can be any of a number of ceramics, including the compounds of barium titanate. The block is further plated with a conductive material on all of its surfaces with the exception of the surface adjoining the plate. In other embodiments of the inventive ceramic filter, shunt capacitors or shunt inductors can be plated on the first surface of the plate and coupled to the input electrode for providing a bandpass/bandstop response characteristic.

DETAILED DESCRIPTION OF THE PREFERRED EMBODIMENTS

Figure 1:
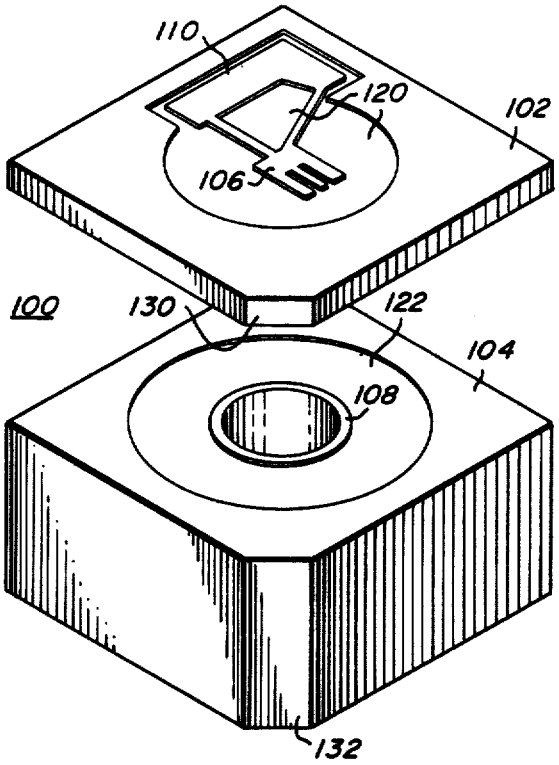
FIG. 1 is a prespective view of a ceramic bandstop/-bandpass filter embodying the present invention.

In FIG. 1, there is illustrated a ceramic bandstop/-bandpass filter 100 embodying the present invention. Filter 100 includes a top plate 102 and block 104 which are both comprised of a dielectric material that is selectively plated with a conductive material. Filter 100 can be constructed of any suitable dielectric material that has low loss, a high dielectric constant and a low temperature coefficient of the dielectric constant. In a preferred embodiment, filter 100 is comprised of a ceramic compound including barium oxide, titanium oxide and zirconium oxide, the electrical characteristics of which are described in more detail in an article by G. H. Jonker and W. Kwestroo, entitled "The Ternary Systems $BaO-TiO_2-SnO_2$ and $BaO-TiO_2-ZrO_2$", published in the Journal of the American Ceramic Society, volume 41, number 10, at pages 390–394 October 1958. Of the ceramic compounds described in this article, the compound in Table VI having the composition 18.5 mole % BaO, 77.0 mole % $TiO_2$ and 4.5 mole % $ZrO_2$ and having dielectric constant of 40 is well suited for use in the ceramic filter of the present invention.

Referring to FIG. 1, the top plate 102 and block 104 of filter 100 are plated with an electrically conductive material, such as copper or silver, with the exception of unplated areas 120 and 122, respectively. Block 104 of filter 100 includes a hole 108 that extends from its top surface to its bottom surface. Hole 108 is likewise plated with an electrically conductive material, and the plating of hole 108 is electrically connected to the plating on the bottom surface of block 104. When plated and coupled to signal ground, block 104 is essentially a short-circuited coaxial transmission line having a length selected for desired filter response characteristics.

Figure 3:
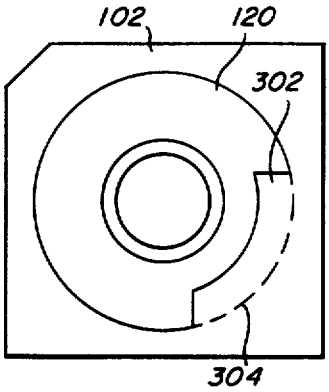
FIG. 3 is a bottom view of the top plate of the ceramic bandstop/bandpass filter in FIG. 1.

Top plate 102 in FIG. 1 includes an input electrode 106 that has a plurality of fingers. Input electrode 106 can be coupled to an input signal from a signal source, which in turn is capacitively coupled from input electrode 106 to the coaxial transmission line provided by block 104. The amount of capacitance between input electrode 106 and block 104 can be adjusted by manually or automatically trimming the fingers of electrode 106. For example, a laser could be used to accurately trim the fingers of electrode 106. Input electrode 106 is also coupled by two plating runners to electrode 110, which is the top electrode of a shunt capacitor. Electrode 110 and plating area 302 in FIG. 3 on the bottom surface of plate 102, together form a shunt capacitor. As illustrated in FIG. 3, the plating on the bottom of plate 102 is substantially identical to the plating on the top of block 104 with the exception of area 302. If electrode 110 is not present on plate 102, the plating on the bottom of plate 102 in FIG. 3 extends only to dashed line 304 (area 120 being unplated).

Both top plate 102 and block 104 in FIG. 1 have a substantially square cross section. In an embodiment of filter 100 operable in the 453 to 458 mHz frequency range, each side of top plate 102 and block 104 has a length of 35.1 mm., the height of top plate is 2.93 mm., the height of block 104 is 18.9 mm., and the diameter of hole 108 is 10.7 mm. Top plate 102 and block 104 also have beveled edges 130 and 132, respectively, to insure they are properly aligned when they are fixedly attached together by soldering or other means. Although shown with a rectangular shape in FIG. 1, ceramic filter 10 can have any suitable irregular or regular shape, such as, for example, the shape of a cylinder or a parallelpiped.

Figure 2:
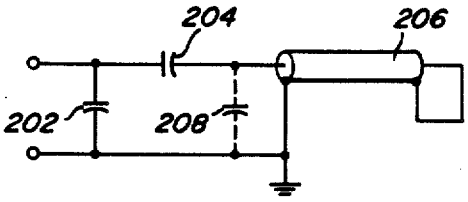
FIG. 2 is an electrical circuit diagram for the ceramic bandstop/bandpass filter in FIG. 1.

Referring to FIG. 2, there is illustrated an equivalent circuit diagram for the ceramic bandstop/bandpass filter 100 in FIG. 1. An input signal from a signal source is applied to input electrode 106 in FIG. 1, which corresponds to capacitor 204 in FIG. 2. Capacitor 202 in FIG. 2 corresponds to the capacitance provided by electrodes 110 and 302 on plate 102 in FIGS. 1 and 3, respectively. Capacitor 208 represents the stray capacitance that exists between the ground plating on the top surface of block 104 and hole 108 in FIG. 1. Coaxial transmission line 206 in FIG. 2 corresponds to block 104 in FIG. 1. The frequency response of filter 100 in FIG. 1 is characterized by a passband of frequencies and a stopband of frequencies which are greatly attentuated with respect to the passband of frequencies. Inclusion of shunt capacitor 202 causes the passband of frequencies to be located above the stopband of frequencies.

Figure 4:
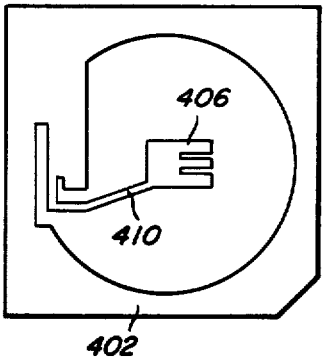
FIG. 4 is a top view of another top plate for the ceramic bandstop/bandpass filter in FIG. 1.

If it is desired to have the passband of frequencies below the stopband of frequencies, the shunt capacitor 202 can be replaced by a shunt inductor. A shunt inductor can be provided by a transmission line, such as strip electrode 410 which is plated on the top plate 402 as illustrated in FIG. 4. Strip electrode 410 is connected between input electrode 406 and the surrounding plated area which is in turn coupled to signal ground when attached to block 104 in FIG. 1. The equivalent circuit diagram for such a filter is illustrated in FIG. 6, where inductor 602 corresponds to strip electrode 406 in FIG. 4.

Figure 5:
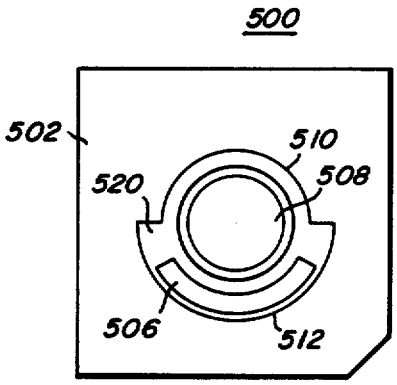
FIG. 5 is a top view of another ceramic bandstop filter embodying the present invention.

According to yet another embodiment of the present invention, a ceramic bandstop filter 500 can be provided by a single plated block 502 of dielectric material as illustrated in FIG. 5. Block 502 in FIG. 5 has a hole 508 and is plated with a conductive material with the exception of unplated area 520. Input electrode 506 capacitively couples an input signal to the short-circuited coaxial transmission line provided by block 502. In an embodiment of filter 500 operable in the 453 to 458 mHz frequency range, each side of block 502 has a length of 35.1 mm., the height of block 502 is 22.35 mm., and the diameter of hole 508 is 10.7 mm.

Figure 7:
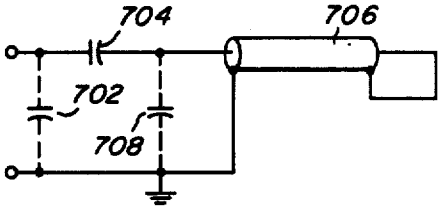
FIG. 7 is an electrical circuit diagram for the ceramic bandstop/bandpass filter in FIG. 5.

The equivalent circuit diagram for block 502 is shown in FIG. 7. Capacitor 704 represents the capacitance between input electrode 506 and the plating of hole 508 in FIG. 5. Capacitor 702 represents the stray capacitance between input electrode 506 and the edge 512 of the surrounding plating, and capacitor 708 represents the stray capacitance between hole 508 and the edge 510 of surrounding plating of block 502 in FIG. 5. The magnitude of capacitors 702 and 708 can be adjusted by adding or removing plating at edges 512 and 510, respectively. Coaxial transmission line 706 corresponds to block 502 in FIG. 5. The frequency response of block 502 in FIG. 5 is characterized by a stopband of frequencies which are greatly attenuated with respect to frequencies outside the stopband.

Figure 6:
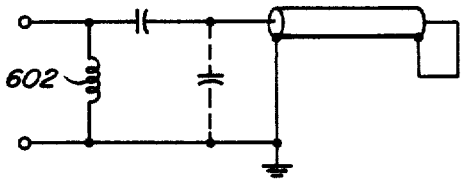
FIG. 6 is an electrical circuit diagram for the ceramic bandstop filter in FIG. 4.

Ceramic filter 500 in FIG. 5 can likewise be converted to a bandstop/bandpass filter by interconnecting input electrode 506 with a shunt capacitor or shunt inductor as illustrated in FIGS. 2 and 6, respectively. The shunt inductor can be a discrete component or can be plated on the top surface of block 502 as shown in FIG. 4. The shunt capacitor can be a discrete component or can be provided by capacitor 702 in FIG. 5, which represents the capacitance between input electrode 506 and the surrounding ground plating.

Figure 8:
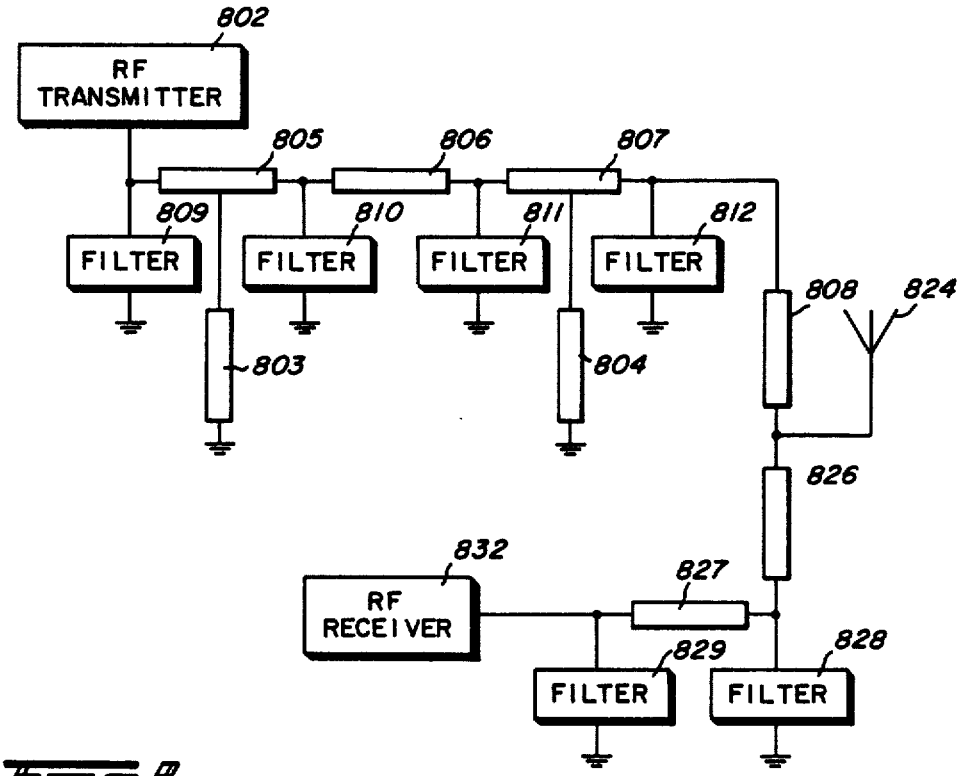
FIG. 8 is a block diagram of an antenna duplexer comprised of a number of the ceramic bandstop/bandpass filters of the present invention for selectively coupling transmit and receive signals to an antenna.

According to yet another feature of the present invention, the ceramic bandpass/bandstop filters of the present invention can be arranged to provide apparatus that combines and/or frequency sorts two RF signals into and/or from a composite RF signal. For example, one application of the RF signal combining/sorting apparatus is an antenna duplexer which couples a transmit signal from an RF transmitter to an antenna and a receive signal from the antenna to an RF receiver, as illustrated in FIG. 8. In FIG. 8, a duplexer couples RF transmitter 802 and RF receiver 832 to antenna 824. The duplexer is made up of a transmitter filter including circuit elements 803–812 and a receiver filter including circuit elements 826–829. The transmitter filter 803–812 includes four ceramic bandstop or bandstop/bandpass filters 809–812 which are intercoupled by quarter-wave transmission lines 805–807. The stopband of frequencies for filters 809–812 includes the frequency of the receive signal, and the stopband of frequencies for filters 828 and 829 includes the frequency of the transmit signal. If ceramic bandstop/bandpass filters are used, filters 809–812 include shunt capacitors and filters 828 and 829 include shunt inductors when the frequency of the transmit signal is below the frequency of the receive signal, and vice versa when the frequency of the transmit signal is greater than the frequency of the receive signal.

Filters 812 and 828 are coupled to antenna 824 by way of quarter-wave transmission lines 808 and 826, respectively. Although transmitter filter 803–812 includes four ceramic filters 809–812 and receiver filter 826–829 includes two ceramic filters 828 and 829, any number of ceramic filters can be utilized in the unique RF signal combining/sorting apparatus depending upon the electrical characteristics desired.

The transmitter filter 803–812 also includes shorted transmission lines 803 and 804 positioned at the midpoint of transmission lines 805 and 807, respectively, for suppressing harmonic frequencies generated by RF transmitter 802. Transmission lines 803 and 804 have a length equal to a quarter-wavelength at the frequency of the transmit signal. Therefore, transmission lines 803 and 804 are open circuits at the transmit signal frequency and short circuits at even harmonics of the transmit signal frequency. Thus, the even order harmonics of the transmit signal frequency are greatly attentuated by transmission lines 803 and 804. Depending on the desired electrical characteristics, one or more shorted transmission lines 803 and 804 can be positioned at the output of RF transmitter, or at any suitable point along transmission lines 805–808.

In an embodiment of the RF signal combining/sorting apparatus in FIG. 8, transmit signals having a frequency range from 453 to 457.475 mHz and receive signals having a frequency range from 463 to 467.475 mHz were coupled to the antenna of a mobile radio. The ceramic bandstop/bandpass filters 809–812 in the transmitter filter 803–812, and 828 and 829 in the receiver filter 826–829 were of the type shown in FIG. 5 with external inductors and capacitors, respectively. The transmitter filter 803–812 had an insertion loss of 1.6dB and attenuated receive signals by at least 63dB. The receive filter 826–829 had an insertion loss of 1.5dB and attenuated transmit signals by at least 40dB. By arranging the six ceramic bandstop/bandpass filters 809–812, 828 and 829 side by side and coupling them to transmission lines 803–808, 826 and 827 on a circuit board on top of the six filters, the combining/sorting apparatus can be provided in a space only slightly bigger than that occupied by the six filters themselves.

In summary, an improved ceramic filter has been described that is more reliable and smaller than prior art filters. The construction of the ceramic filter of the present invention not only is simple but also is amenable to automatic fabricating and adjusting techniques. The inventive ceramic filter can provide a bandstop or bandstop/bandpass frequency response characteristic simply by exclusion or inclusion of shunt capacitors or shunt inductors. In addition, a number of ceramic bandstop/-bandpass filters can be used to combine and/or frequency sort two or more RF signals from a composite RF signal. This feature of the present invention can be advantegeously utilized for providing an antenna duplexer where a transmit signal is coupled to an antenna and a receive signal is coupled from the antenna.

We claim:

1. A bandstop filter comprising:

first means comprised of a dielectric material and having top and bottom surfaces, said first dielectric means further including electrode means comprised of a conductive material disposed on the top surface;

second means comprised of a dielectric material and having top and bottom surfaces, said second dielectric means further including a hole extending from the top surface to the bottom surface thereof, and said second dielectric means further being covered entirely with a conductive material with the exception of the top surface; and means for attaching the bottom surface of the first dielectric means to the top surface of the second dielectric means so that the electrode means on the top surface of the first dielectric means is arranged substantially opposite to the hole in the second dielectric means.

2. The bandstop filter according to claim 1, wherein the first dielectric means is comprised of a block of a dielectric material having the shape of a cylinder, and the second dielectric means is comprised of a block of a dielectric material having the shape of a cylinder.

3. The bandstop filter according to claim 1, wherein the first dielectric means is comprised of a block of a dielectric material having the shape of a parallelepiped, and the second dielectric means is comprised of a block of a dielectric material having the shape of a parallelepiped.

4. The bandstop filter according to claim 1, further including a signal source for generating an input signal with respect to signal ground, means for coupling the input signal to the electrode means on the top surface of the first dielectric means, and means for coupling the plated portion of the second dielectric means to signal ground.

5. The bandstop filter according to claim 4, further including shunt capacitive means coupled between the input signal and signal ground.

6. The bandstop filter according to claim 5, wherein said shunt capacitive means includes first electrode means comprised of a conductive material disposed on the top surface of the first dielectric means and second electrode means comprised of a conductive material disposed on the bottom surface of the first dielectric means substantially opposite to the first electrode means, the first electrode means being coupled to the electrode means of the first dielectric means, and the second electrode means being coupled to signal ground.

7. The bandstop filter according to claim 4, further including shunt inductive means coupled between the input signal and signal ground.

8. The bandstop filter according to claim 7, wherein said shunt inductive means includes strip electrode means comprised of a conductive material disposed on the top surface of the first dielectric means, one end of the strip electrode means being coupled to the electrode means of the first dielectric means, and the other end of the strip electrode means being coupled to signal ground.

9. The bandstop filter according to claim 1, wherein the electrode means on the top surface of the first dielectric means includes a plurality of fingers intercoupled at one end.

10. The bandstop filter according to claim 9, adapted to be tuned to attenuate a pre-selected range of frequencies by tuning means, said tuning means including means for triming the fingers of the electrode means for tuning said bandstop filter.

11. A bandstop filter comprising:

means comprised of a dielectric material and having top and bottom surfaces, said dielectric means further including a hole extending from the top surface to the bottom surface thereof, and said dielectric means further being covered entirely with a conductive material with the exception of the top surface; and capacitive means including electrode means comprised of a conductive material disposed on the top surface of the dielectric means at a predetermined distance from the hole in the dielectric means.

12. The bandstop filter according to claim 11, wherein the dielectric means is comprised of a block of a dielectric material having the shape of a cylinder.

13. The bandstop filter according to claim 11, wherein the dielectric means is comprised of a block of a dielectric material having the shape of a parallelepiped.

14. The bandstop filter according to claim 11, further including a signal source for generating an input signal with respect to signal ground, means for coupling the input signal to the electrode means on the top surface of the dielectric means, and means for coupling the plated portion of the dielectric means to signal ground.

15. The bandstop filter according to claim 14, further including shunt capacitive means coupled between the input signal and signal ground.

16. The bandstop filter according to claim 15, wherein said shunt capacitive means includes electrode means comprised of a conductive material disposed on the top surface of the dielectric means at a predetermined distance from the electrode means of the capacitive means and being coupled to signal ground.

17. The bandstop filter according to claim 16, adapted to be tuned to pass a pre-selected range of frequencies by tuning means, said tuning means including means for trimming the electrode means of the shunt capacitive means for tuning said bandstop filter.

18. The bandstop filter according to claim 14, further including shunt inductive means coupled between the input signal and signal ground.

19. The bandstop filter according to claim 18, wherein said shunt inductive means including strip electrode means comprised of a conductive material disposed on the top surface of the dielectric means, one end of the strip electrode means being coupled to the electrode means of the capacitive means, and the other end of the strip electrode means being coupled to signal ground.

20. The bandstop filter according to claim 19, adapted to be tuned to pass a pre-selected range of frequencies by tuning means, said tuning means including means for triming the strip electrode means of the shunt inductive means for tuning said bandstop filter.

21. The bandstop filter according to claim 11, adapted to be tuned to attenuate a pre-selected range of frequencies, said tuning means including means for triming the electrode means of the capacitive means.

22. A bandpass/bandstop filter comprising:

first means comprised of a dielectric material and having parallel, flat, top and bottom surfaces, said first dielectric means further including input electrode means comprised of a conductive material plated on the top surface;

second means comprised of a dielectric material and having parallel, flat, top and bottom surfaces, said second dielectric means further including a hole extending from the top surface to the bottom surface thereof, and said second dielectric means further being plated entirely with a conductive material with the exception of the top surface;

means for attaching the bottom surface of the first dielectric means to the top surface of the second dielectric means so that the input electrode means on the top surface of the first dielectric means is arranged substantially opposite to the hole in the second dielectric means; and shunt capacitive means coupled between the input electrode means on the top surface of the first dielectric means and signal ground.

23. The bandstop/bandpass filter according to claim 22, wherein the first dielectric means is comprised of a block of a dielectric material having the shape of a cylinder, and the second dielectric means is comprised of a block of a dielectric material having the shape of a cylinder.

24. The bandstop/bandpass filter according to claim 22, wherein the first dielectric means is comprised of a block of a dielectric material having the shape of a parallelepiped, and the second dielectric means is comprised of a block of a dielectric material having the shape of a parallelepiped.

25. The bandstop/bandpass filter according to claim 22, further including a signal source for generating an input signal with respect to signal ground, means for coupling the input signal to the input electrode means on the top surface of the first dielectric means, and means for coupling the plated portion of the second dielectric means to signal ground.

26. The bandstop/bandpass filter according to claim 22, wherein said shunt capacitive means includes first electrode means comprised of a conductive material plated on the top surface of the first dielectric means and second electrode means comprised of a conductive material plated on the bottom surface of the first dielectric means substantially opposite to the first electrode means, the first electrode means being coupled to the input electrode means, and the second electrode means being coupled to signal ground.

27. A bandstop/bandpass filter comprising:

first means comprised of a dielectric material and having parallel, flat, top and bottom surfaces, said first dielectric means further including input electrode means comprised of a conductive material plated on the top surface;

second means comprised of a dielectric material and having parallel, flat, top and bottom surfaces, said second dielectric means further including a hole extending from the top surface to the bottom surface thereof, and said second dielectric means further being plated entirely with a conductive material with the exception of the top surface;

means for attaching the bottom surface of the first dielectric means to the top surface of the second dielectric means so that the input electrode means on the top surface of the first dielectric means is arranged substantially opposite to the hole in the second dielectric means; and shunt inductive means coupled between the input electrode means on the top surface of the first dielectric means and signal ground.

28. The bandstop/bandpass filter according to claim 27, wherein the first dielectric means is comprised of a block of a dielectric material having the shape of a cylinder, and the second dielectric means is comprised of a block of a dielectric material having the shape of a cylinder.

29. The bandstop/bandpass filter according to claim 27, wherein the first dielectric means is comprised of a block of a dielectric material having the shape of a parallelepiped, and the second dielectric means is comprised of a block of a dielectric material having the shape of a parallelepiped.

30. The bandstop/bandpass filter according to claim 27, further including a signal source for generating an input signal with respect to signal ground, means for coupling the input signal to the input electrode means on the top surface of the first dielectric means, and means for coupling the plated portion of the second dielectric means to signal ground.

31. The bandstop/bandpass filter according to claim 27, wherein said shunt inductive means includes strip electrode means comprised of a conductive material plated on the top surface of the first dielectric means, one end of the strip electrode means being coupled to the input electrode means, and the other end of the strip electrode means being coupled to signal ground.

32. A bandstop filter comprising:

means comprised of a dielectric material and having parallel, flat, top and bottom surfaces, said dielectric means further including a hole extending from the top surface to the bottom surface thereof, and said dielectric means further being plated entirely with a conductive material with the exception of the top surface;

capacitive means including electrode means comprised of a conductive material plated on the top surface of the dielectric means at a predetermined distance from the hole in the dielectric means; and shunt capacitive means coupled between the electrode means and signal ground.

33. The bandstop filter according to claim 32, wherein the dielectric means is comprised of a block of a dielectric material having the shape of a cylinder.

34. The bandstop filter according to claim 32, wherein the dielectric means is comprised of a block of a dielectric material having the shape of a parallelepiped.

35. The bandstop filter according to claim 32, further including a signal source for generating an input signal with respect to signal ground, means for coupling the input signal to the electrode means on the top surface of the dielectric means, and means for coupling the plated portion of the dielectric means to signal ground.

36. The bandstop filter according to claim 32, wherein said shunt capacitive means includes electrode means comprised of a conductive material plated on the top surface of the dielectric means at a predetermined distance from the electrode means of the capacitive means and being coupled to signal ground.

37. A bandstop filter comprising:

means comprised of a dielectric material and having parallel, flat, top and bottom surfaces, said dielectric means further including a hole extending from the top surface to the bottom surface thereof, and said dielectric means further being plated entirely with a conductive material with the exception of the top surface;

capacitive means including electrode means comprised of a conductive material plated on the top surface of the dielectric means at a predetermined distance from the hole in the dielectric means; and shunt inductive means coupled between the electrode means and signal ground.

38. The bandstop filter according to claim 37, wherein the dielectric means is comprised of a block of a dielectric material having the shape of a cylinder.

39. The bandstop filter according to claim 37, wherein the dielectric means is comprised of a block of a dielectric material having the shape of a parallelepiped.

40. The bandstop filter according to claim 37, further including a signal source for generating an input signal with respect to signal ground, means for coupling the input signal to the electrode means on the top surface of the dielectric means, and means for coupling the plated portion of the dielectric means to signal ground.

41. The bandstop filter according to claim 37, wherein said shunt inductive means including strip electrode means comprised of a conductive material plated on the top surface of the dielectric means, one end of the strip electrode means being coupled to the input electrode means, and the other end of the strip electrode means being coupled to signal ground.

*42. A transmission line device comprising:*

*first means comprised of a dielectric material and having top, bottom and side surfaces, said first dielectric means further including electrode means disposed on the top surface;*

*second means comprised of a dielectric material and having top, bottom, side and internal surfaces, said internal surface produced by a hole extending from the top surface toward the bottom surface of said second dielectric means, and portions of the surfaces of said second dielectric means further being covered with a conductive material for producing a transmission line; and*

*means for attaching the bottom surface of the first dielectric means to the top surface of the second dielectric means so that said first and second dielectric means are attached together and at least a portion of the electrode means is arranged substantially opposite to the hole in the second dielectric means.*

*43. The transmission line device according to claim 42, wherein the first dielectric means is comprised of a block of a dielectric material having the shape of cylinder, and the second dielectric means is comprised of a block of a dielectric material having the shape of a cylinder.*

*44. The transmission line device according to claim 42, wherein the first dielectric means is comprised of a block of a dielectric material having the shape of a parallelepiped, and the second dielectric means is comprised of a block of a dielectric material having the shape of a parallelepiped.*

*45. The transmission line device according to claim 42, further including a signal source for generating an input signal with respect to signal ground, means for coupling the input signal to the electrode means on the top surface of the first dielectric means, and means for coupling the plated portion of the second dielectric means to signal ground.*

*46. The transmission line device according to claim 42, further including second electrode means disposed on the top surface of the second dielectric means.*

*47. The transmission line device according to claim 46, wherein said second electrode means is coupled to said conductive material.*

*48. The transmission line device according to claim 42, further including shunt capacitive means coupled between the electrode means and signal ground.*

*49. The transmission line device according to claim 48, wherein said shunt capacitive means includes first electrode means disposed on the top surface of the first dielectric means and second electrode means disposed on the bottom surface of the first dielectric means substantially opposite to the first electrode means, the first electrode means being coupled to the electrode means of the first dielectric means, and the second electrode means being coupled to signal ground.*

*50. The transmission line device according to claim 42, further including shunt inductive means coupled between the electrode means and signal ground.*

*51. The transmission line device according to claim 50, wherein said shunt inductive means includes strip electrode means disposed on the top surface of the first dielectric means, one end of the strip electrode means being coupled to the electrode means of the first dielectric means, and the other end of the strip electrode means being coupled to signal ground.*

*52. The transmission line device according to claim 42, wherein the electrode means on the top surface of the first dielectric means includes a plurality of fingers intercoupled at one end.*

*53. A transmission line device comprising:*

*means comprised of a dielectric material and having top, bottom, side and internal surfaces, said internal surface produced by a hole extending from the top surface toward the bottom surface of the dielectric means, and the bottom, side and internal surfaces of said dielectric means further being covered entirely*

*with a conductive material for producing a transmission line; and*

*capacitive means including electrode means disposed on the top surface of the dielectric means at a predetermined distance from the hole in the dielectric means.*

*54. The transmission line device according to claim 53, wherein the dielectric means is comprised of a block of dielectric material having the shape of cylinder.*

*55. The transmission line device according to claim 53, wherein the dielectric means is comprised of a block of dielectric material having the shape of a parallelepiped.*

*56. The transmission line device according to claim 53, further including a signal source for generating an input signal with respect to signal ground, means for coupling the input signal to the electrode means on the top surface of the dielectric means, and means for coupling said conductive material to signal ground.*

*57. The transmission line device according to claim 53, further including shunt capacitive means coupled between the electrode means and signal ground.*

*58. The transmission line device according to claim 57, wherein said shunt capacitive means includes electrode means disposed on the top surface of the dielectric means at a predetermined distance from the electrode means of the capacitive means and being coupled to signal ground.*

*59. The transmission line device according to claim 53, further including shunt capacitive means coupled between the hole in the dielectric means and signal ground.*

*60. The transmission line device according to claim 59, wherein said shunt capacitive means includes electrode means at a predetermined distance from the hole in the dielectric means and being coupled to signal ground.*

*61. The transmission line device according to claim 53, further including shunt inductive means coupled between the electrode means and signal ground.*

*62. The transmission line device according to claim 61, wherein said shunt inductive means includes strip electrode means comprised of a conductive material disposed on the top surface of the dielectric means, one end of the strip electrode means being coupled to the electrode means of the capacitive means, and the other end of the strip electrode means being coupled to signal ground.*

*63. A filter having a passband of frequencies, comprising:*

*first means comprised of a dielectric material and having top and bottom surfaces, said first dielectric means further including electrode means comprised of a conductive material disposed on the top surface;*

*second means comprised of a dielectric material and having top and bottom surfaces, said second dielectric means further including a hole extending from the top surface to the bottom surface thereof, and said second dielectric means further being covered entirely with a conductive material with the exception of the top surface; and*

*means for attaching the bottom surface of the first dielectric means to the top surface of the second dielectric means so that the electrode means on the top surface of the first dielectric means is arranged substantially opposite to the hole in the second dielectric means.*

*64. The filter according to claim 63, wherein the first dielectric means is comprised of a block of a dielectric material having the shape of a cylinder, and the second dielectric means is comprised of a block of a dielectric material having the shape of a cylinder.*

*65. The filter according to claim 63, wherein the first dielectric means is comprised of a block of a dielectric material having the shape of a parallelepiped, and the second dielectric means is comprised of a block of a dielectric material having the shape of a parallelepiped.*

*66. The filter according to claim 63, further including a signal source for generating an input signal with respect to signal ground, means for coupling the input signal to the electrode means on the top surface of the first dielectric means, and means for coupling the conductive material covering the second dielectric means to signal ground.*

*67. The filter according to claim 63, further including shunt capacitive means coupled between the electrode means and signal ground.*

*68. The filter according to claim 67, wherein said shunt capacitive means includes first electrode means comprised of a conductive material disposed on the top surface of the first dielectric means and second electrode means comprised of a conductive material disposed on the bottom surface of the first dielectric means substantially opposite to the first electrode means, the first electrode means being coupled to the electrode means of the first dielectric means, and the second electrode means being coupled to signal ground.*

*69. The filter according to claim 63, further including shunt inductive means coupled between the electrode means and signal ground.*

*70. The filter according to claim 69, wherein said shunt inductive means includes strip electrode means comprised of a conductive material disposed on the top surface of the first dielectric means, one end of the strip electrode means being coupled to the electrode means of the first dielectric means, and the other end of the strip electrode means being coupled to signal ground.*

*71. The filter according to claim 63, wherein the electrode means on the top surface of the first dielectric means includes a plurality of fingers intercoupled at one end.*

*72. A radio, comprising in combination:*

*an antenna;*

*a transmitter;*

*a receiver;*

*an antenna duplexer for coupling said receiver to said antenna and coupling said transmitter to said antenna, said antenna duplexer further including at least one transmission line device comprising:*

*first means comprised of a dielectric material and having top, bottom and side surfaces, said first dielectric means further including electrode means disposed on the top surface;*

*second means comprised of a dielectric material and having top, bottom, side and internal surfaces, said internal surface produced by a hole extending from the top surface toward the bottom surface of said second dielectric means, and portions of the surfaces of said second dielectric means further being covered with a conductive material for producing a transmission line; and*

*means for attaching the bottom surface of the first dielectric means to the top surface of the second dielectric means so that said first and second dielectric means are attached together and at least a portion of the electrode means is arranged substantially opposite to the hole in the second dielectric means.*

*73. A radio, comprising in combination:*

*an antenna;*

*a transmitter;*

*a receiver;*

*an antenna duplexer for coupling said receiver to said antenna and coupling said transmitter to said an-*

*tenna, said antenna duplexer further including at least one transmission line device comprising:*

*means comprised of a dielectric material and having top, bottom, side and internal surfaces, said internal surface produced by a hole extending from the top surface toward the bottom surface of the dielectric means, and the bottom, side and internal surfaces of said dielectric means further being covered entirely with a conductive material for producing a transmission line; and*

*capacitive means including electrode means disposed on the top surface of the dielectric means at a predetermined distance from the hole in the dielectric means.*

*74. An antenna duplexer for coupling a radio to an antenna, said antenna duplexer further including at least one transmission line device comprising:*

*first means comprised of a dielectric material and having top, bottom and side surfaces, said first dielectric means further including electrode means disposed on the top surface;*

*second means comprised of a dielectric material and having top, bottom, side and internal surfaces, said internal surface produced by a hole extending from the top surface toward the bottom surface of said second dielectric means, and portions of the surfaces of said second dielectric means further being covered with a conductive material for producing a transmission line; and*

*means for attaching the bottom surface of the first dielectric means to the top surface of the second dielectric means so that said first and second dielectric means are attached together and at least a portion of the electrode means is arranged substantially opposite to the hole in the second dielectric means.*

* * * * *